UNITED STATES PATENT OFFICE.

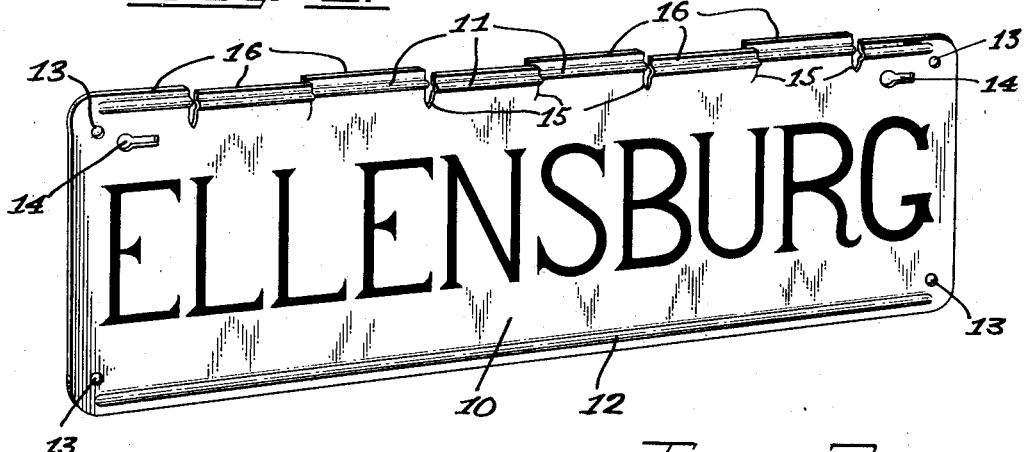
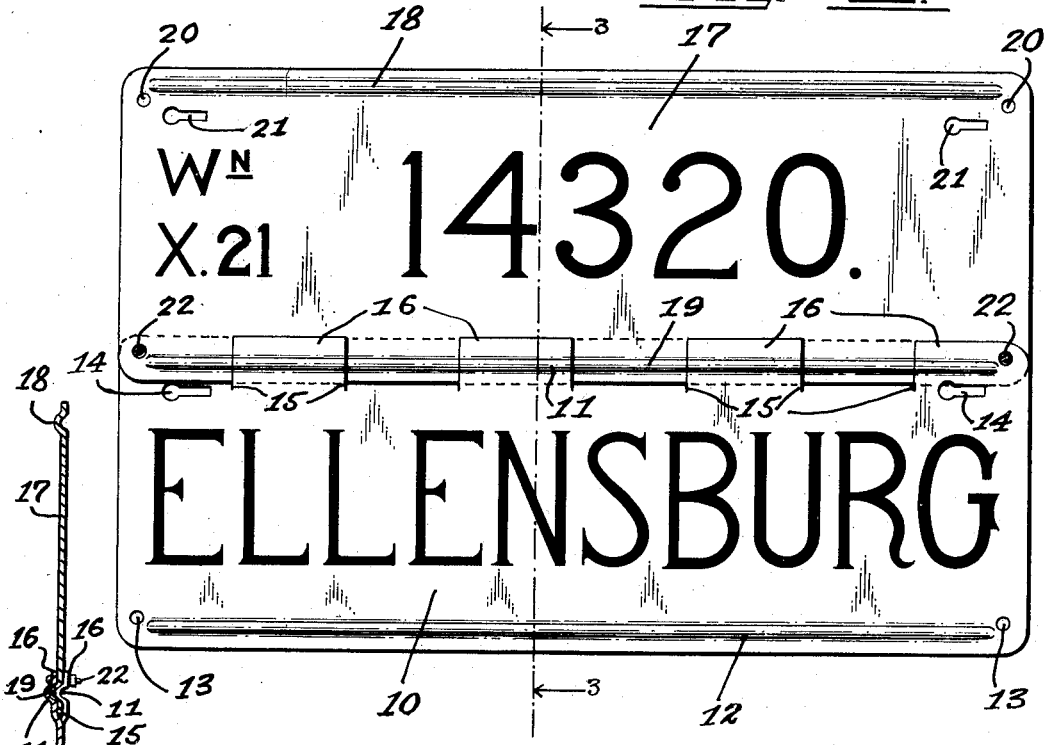

THOMAS R. JACOBSEN, OF ELLENSBURG, WASHINGTON.

DISPLAY-PLATE.

1,369,436.                    Specification of Letters Patent.    Patented Feb. 22, 1921.

Application filed July 27, 1920. Serial No. 399,420.

*To all whom it may concern:*

Be it known that I, THOMAS R. JACOBSEN, a citizen of the United States, residing at Ellensburg, in the county of Kittitas and State of Washington, have invented a certain new and useful Improvement in Display-Plates, of which the following is a specification.

My invention relates to improvements in display or name plates for automobiles that are adapted to be fastened to the license plates thereof, and the object of my invention is to provide a display plate which may be quickly and rigidly attached to the license plates or to any other desired part of an automobile.

Another object is to provide a display plate of neat appearance upon which the name of the home town of the automobile owner, the owner's name, or any other desired inscription, name or design, may be conspicuously displayed for the purpose of advertising said town, name or design, and for the purpose of aiding the authorities in the apprehension of any traffic law violators particularly when the license number of said automobile is obscure or difficult to decipher.

With the above and other objects in view which will appear as the description proceeds the invention consists of the novel construction, adaptation, arrangement and combination of parts hereinafter described and claimed.

I accomplish these objects by devices illustrated in the accompanying drawings, wherein—

Figure 1 is a view in perspective of an automobile display plate embodying the features of my invention.

Fig. 2 is a view in front elevation of my display plate as it may appear when attached to an automobile license plate.

Fig. 3 is a view in vertical transverse section taken on a broken line 3, 3 of Fig. 2.

Referring to the drawings, throughout which like reference numerals designate like parts, the numeral 10 designates my display plate which is provided adjacent the upper and lower edge portions thereof with longitudinally disposed grooved stiffening beads 11 and 12 respectively.

To furnish selective means for the attachment of the plate 10 to any desired part of the automobile I have provided the corners of the said plate with suitable holes or apertures 13 adapted to receive the fastening means such as bolts or screws not shown, the said plate being also further provided adjacent the upper corners thereof with slotted holes or apertures 14 for the reception of the fastening means such as bolts or screws, when it is desired to adjustably attach or secure the plate 10 to the selected part of the automobile. The upper edge portion of the plate 10 is cut or split at regular or equi-distant intervals as at 15 in a vertical downward direction to a point below the bead 11 to provide a linear series of sectional portions which are adapted to be alternately offset or flexed from the normal plane of the plate 10 to form a plurality of resilient or flexible clip elements 16 as shown in Fig. 1.

The main body portion of the plate 10 is adapted to receive the name of the automobile owner or the name of the town of the said owner as for example the word "Ellensburg", which may be stamped, painted or otherwise applied thereon.

The numeral 17 designates a license plate of an automobile to which my display plate 10 is adapted to be attached, the said license plate being provided adjacent the upper and lower edge portions thereof with longitudinal grooved stiffening beads 18 and 19 respectively.

The corners of the said license plate are provided with the usual holes or apertures 20 adapted for the reception of the fastening or securing means such as bolts or screws not shown. The said license plate is also further provided adjacent the upper corners thereof with slotted holes or apertures 21 adapted to receive fastening or securing means such as bolts or screws when it is desired to adjustably secure the said plate 17 to the selected part of the automobile.

To attach or position the display plate 10 to or on the license plate 17, the clip elements 16 on the upper edge portion of the plate 10 are slipped or sprung over the grooved bead 19 formed on the lower edge portion of the plate 17 in such a manner that the said clip elements 16 alternately and functionally engage the opposite sides of the said lower edge portion of the plate 17 to thereby permit the concave and convex sides of the grooved bead 11 of the plate 10 to alternately seat in and on the concave and convex surfaces of the grooved bead 19 of the plate 17 as shown more clearly in Figs. 2 and 3.

The resilient and frictional engagement of the clip elements 16 on the bead 19 serves in part to retain the plates 10 and 17 in vertical alinement with respect to each other, but, to insure of a positive and rigid connection between the said plates I provide stove bolts 22 which are adapted to rigidly secure the upper edge portion of the plate 10 to the lower edge portion of the plate 17 as shown in Figs. 2 and 3.

While I show and describe my display plate as being attached to the license plate of an automobile, I desire to have it clearly understood that the same is readily attachable to any other selected or convenient part of an automobile by using either the holes 13 or the slots 14 provided in the said display plate for fixedly or adjustably mounting the same thereon as desired.

From the foregoing description taken in connection with the accompanying drawings, the advantages of the construction and of the method of operation of my display plate for automobile will be readily apparent to those skilled in the art to which the invention relates, and while I have described the principle of operation of the invention, together with the device which I now consider to be the best embodiment thereof, I desire to have it understood that the device shown is merely illustrative and that such changes may be made when desired as are within the scope of the invention.

What I claim is:—

In combination with a motor vehicle license plate having a longitudinally disposed grooved stiffening bead formed on the lower edge portion thereof, of a display device comprising a rectangular plate, a linear series of integral clips bent alternately in opposite direction to each other along the upper edge portion of said plate adapted to operatively and alternately engage the opposite sides of the lower edge portion of the said license plate and grooved beads formed on said clips adapted to engage the beads on said license plate.

In witness whereof, I hereunto subscribe my name this 20th day of July, A. D. 1920.

THOMAS R. JACOBSEN.